United States Statutory Invention Registration [19]

Matta

[11] Reg. Number: H337

[43] Published: Oct. 6, 1987

[54] DELAYED SWELL VISCOMETER

[75] Inventor: Joseph E. Matta, Bel Air, Md.

[73] Assignee: The United States of America as represented by the Secretary of the Army, Washington, D.C.

[21] Appl. No.: 944,122

[22] Filed: Dec. 22, 1986

[51] Int. Cl.[4] ..... G01N 11/08

[52] U.S. Cl. ..... 73/55

*Primary Examiner*—Stephen C. Buczinski
*Assistant Examiner*—Linda J. Wallace
*Attorney, Agent, or Firm*—Anthony T. Lane; Harold H. Card, Jr.; Michael C. Sachs

[57] ABSTRACT

A method of measuring the shear viscosity of a polymeric solution by measuring the delayed die swell of a pressurized solution through a capillary.

8 Claims, 1 Drawing Figure

Figure 1:
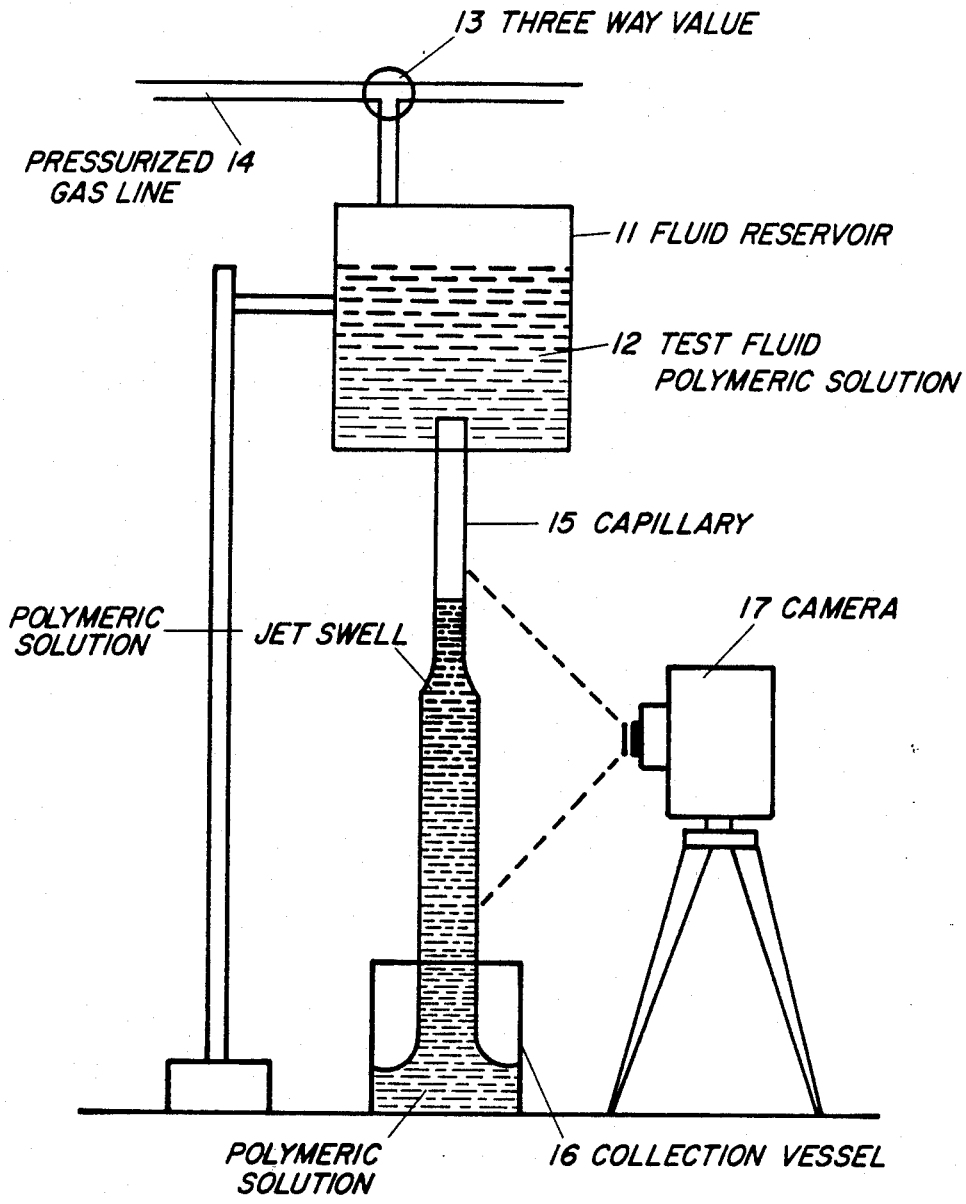

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DELAYED SWELL VISCOMETER

GOVERNMENT INTEREST

The invention described herein may be manufactured, used and licensed by or for the Government for governmental purposes without payment to me of any royalties thereon.

DESCRIPTION OF THE INVENTION

This invention relates to a method of measuring the shear viscosity of a polymeric solution, and an apparatus for using such method.

Although standard capillary methods exist to measure the shear viscosity of a polymeric solution, these methods are often unsuitable for practical purposes when extremely long capillaries are required to insure that entrance effects are negligible.

This invention describes a novel capillary method which uses a recently observed phenomenon of delayed die swell to estimate the shear viscosity of the extruded solution. This invention is in the manner by which one measures the shear viscosity of a polymeric solution using capillary die swell.

When a viscoelastic solution is extruded from a capillary, the diameter of the fluid jet is typically larger than the inner diameter of the capillary. This phenomenon of increase in diameter of fluid jets is well known, and is commonly referred to as die swell. Typically, the swell occurs very quickly in the vicinity of the nozzle, but at high extrusion rates a delayed swell has been reported.

The dimensionalized distance to maximum swell, i.e. the distance from the capillary to maximum swell (X), divided by the inner capillary diameter (D) was found only to depend upon Reynolds number.

Reynolds number, Re, is defined as $Re = pvD/n$, where p, v, n are the density, average velocity, and viscosity of the fluid. The dimensionalized distance varies with Reynolds number being $$X/D - 0.028\ (Re)^{1.24}.$$

The basis of this invention is to increase the polymer extrusion rate until a delayed die swell is observed. From a measurement of the distance to maximum swell, the Reynolds number of the associated capillary flow can be determined, and then the viscosity can also be determined once the average velocity of the flow is known.

It is therefore an object of this invention to provide a method of measuring the shear viscosity of a polymer solution at high rates of shear using a capillary.

Other objects and many attendant advantages of this invention will become better understood from a reading of this specification when taken with the accompanying drawing wherein:

FIG. 1 is a view showing the apparatus of this invention.

In the figure, a fluid reservoir 11 is used to contain the polymer solution 12. A three-way valve 13 connects the reservoir to a regulated pressure line 14 or to the atmosphere. Pressurized gas forces the stored fluid through the capillary tubing 15 centered vertically at the reservoir bottom. The capillary is about 6 inches in length. The fluid is extended downward into a collection vessel 16. A camera 17 is used to photograph the swell of the extruded polymer solution. Measurements of the distance from the nozzle to maximum swell are then obtained from the photo. The sample weights collected over known durations will give the flow rate Q from which the apparent shear rate $\theta$ may be determined according to the formula below, viz.

$$\phi = \frac{32\,Q}{\pi\, pD^3}$$

It is also possible to determine the true shear rate $\gamma$ using the correction for capillary data, i.e.

$$\gamma = \left(\frac{3N+4}{4N+4}\right)\phi$$

wherein N is obtained from the slope of the ln-ln plot of viscosity versus shear rate.

A comparison was made of results obtained using the delayed swell method of this invention with those of the conventional capillary methods. The excellent agreement with the established methods demonstrated that the delayed swell technique is a viable method of measuring the high shear rate viscosity of a polymer solution.

A major advantage of this invention over standard capillary methods lies in the use of shorter capillaries. The use of short capillaries with standard methods are often unsuitable due to significant entrance effects. The delayed swell method of this invention, however, is not subject to the adverse effects since a measurement of the pressure drop across the capillaries is not required in order to determine the shear viscosity. Thus, for various practical reasons, where short capillaries can only be used, shear viscosity measurements are now possible using the delayed swell technique.

Further, through the use of this invention, standard capillary viscosity methods can easily be checked to determine whether entrance effects are truly negligible. Prior to the present invention, measurements with various capillary lengths were required to evaluate the entrance effects of the methods of the art.

Also, for safety reasons, the method of the invention is more suitable for use with toxic fluids since it is not very desirable, and often impractical, to vary the capillary length.

What is claimed:

1. A method of determining the Reynolds number (Re) of a viscous fluid comprising:

forcing a viscous fluid to flow through a capillary by pressure thereby forming a delayed die swell, said capillary of a known inner diameter (D), measuring the dimensional distance (X) between the capillary and the maximum initial width of said delayed die swell, whereby the Reynolds number is ascertained according to the formula:

$$X/D = 0.028\ (Re)^{1.24}.$$

2. The method of claim 1 wherein said viscous fluid is enclosed in a reservoir, and pressure is applied forcing said fluid to flow through a capillary.

3. The method of claim 2 wherein the length of the capillary is 6 inches.

4. The method of claim 2 wherein the distance of maximum initial width of said delayed die swell from said capillary is documented prior to measurement.

5. An apparatus for use in measuring the Reynolds number (Re) of a polymeric solution comprising:

a closed reservoir having a bottom outlet port, said reservoir containing a viscous fluid, means of feeding pressure into said reservoir for forcing said fluid through said outlet port, a short capillary tube of known diameter (D) communicating with said outlet port to provide flow including a delayed die swell of said viscous fluid, a collection vessel in spaced relation to said capillary for receipt of said viscous fluid, and means for use in documenting the flow of said viscous fluid including the distance (X) between the maximum initial width of said delayed die swell and said capillary, whereby the Reynolds number is ascertained according to the formula:

$$X/D = 0.028\ (Re)^{1.24}$$

6. The apparatus of claim 5 wherein said pressure means includes means for introducing a gas under pressure into said reservoir for contact with said viscous fluid.

7. The apparatus of claim 6 wherein said documenting means includes means for photographing said viscous flow and the maximum initial width of said delayed die swell of said viscous flow.

8. The apparatus of claim 7 wherein said documenting means includes means for measuring the distance from said capillary to the maximum initial width of said delayed die swell.

* * * * *